United States Patent
Linkenbach

(12) 
(10) Patent No.: US 6,296,327 B1
(45) Date of Patent: Oct. 2, 2001

(54) BRAKING DEVICE

(75) Inventor: Steffen Linkenbach, Eschborn (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/230,793

(22) PCT Filed: Aug. 7, 1997

(86) PCT No.: PCT/EP97/04303

§ 371 Date: Sep. 24, 1999

§ 102(e) Date: Sep. 24, 1999

(87) PCT Pub. No.: WO98/05538

PCT Pub. Date: Feb. 12, 1998

(30) Foreign Application Priority Data

Aug. 7, 1996 (DE) .............................................. 196 31 862

(51) Int. Cl.[7] .................................................. B60T 8/86
(52) U.S. Cl. ............................................ 303/125; 477/201
(58) Field of Search ................................. 303/9, 9.61, 16, 303/125, 155, 19; 180/315; 477/96, 97, 183, 184, 201

(56) References Cited

U.S. PATENT DOCUMENTS

| | | | |
|---|---|---|---|
| 4,020,931 | * 5/1977 | Sertori | 192/3 TR |
| 4,061,215 | * 12/1977 | Ishikawa | 192/4 A |
| 4,146,108 | * 3/1979 | Sato | 180/103 BF |
| 5,023,599 | * 6/1991 | Mitchell et al. | 340/467 |
| 5,158,343 | * 10/1992 | Reichelt et al. | 303/113 |
| 5,282,399 | * 2/1994 | Sano et al. | 74/856 |
| 5,293,976 | * 3/1994 | Naruse | 192/1.57 |
| 5,315,900 | * 5/1994 | Teeter | 477/165 |
| 5,381,135 | * 1/1995 | Blount | 340/487 |
| 5,693,927 | * 12/1997 | Wilson | 200/86.5 |
| 5,810,107 | * 9/1998 | Krel | 180/275 |
| 5,835,008 | * 11/1998 | Colemere, Jr. | 340/439 |
| 5,921,641 | * 7/1999 | Lupges et al. | 303/191 |
| 5,924,508 | * 7/1999 | Clauss et al. | 180/179 |
| 5,957,805 | * 9/1999 | Salecker et al. | 477/74 |
| 6,105,705 | * 8/2000 | Faye | 180/275 |

\* cited by examiner

Primary Examiner—Robert J. Oberleitner
Assistant Examiner—Benjamin A. Pezzlo
(74) Attorney, Agent, or Firm—Rader, Fishman & Grauer PLLC

(57) ABSTRACT

A brake device for an automotive vehicle includes an arrangement ensuring that, under defined conditions, braking is initiated already prior to brake pedal application. To this end, an accelerator pedal sensor (4) and a shift lever contact switch (5) are provided, and braking is initiated as soon as the accelerator pedal is released at a speed which is higher than a limit speed, and the contact switch on the shift lever is not actuated.

2 Claims, 2 Drawing Sheets

BRAKING DEVICE

BACKGROUND OF THE INVENTION

The present invention relates to a brake device in an automotive vehicle including an accelerator pedal and a mechanical transmission.

German patent application No. 44 22 664 discloses a brake device of this type. The prior art brake device is based on the following idea: If identifying the driver's intention to initiate braking is possible already prior to the actual pedal application, the stopping distance may be shortened by an automatically initiated brake application. Therefore, the above-mentioned published application suggests sensing both the speed at which the accelerator pedal is released and the speed at which the right foot of the driver approaches the brake pedal. If both the release speed and the approach speed exceed a determined limit value, the interpretation is that the driver intends to brake. The result is that the brake is automatically actuated by way of a so-called 'assistant', and, namely, the lost travel of the brake system is overcome.

The combination of two signals is necessary because the release speed alone does not furnish a sufficient criterion indicating that braking is indeed intended. On the other hand, it is relatively complicated to design a switch or sensor and arrange it in the pedal area of the vehicle where it senses the speed at which the foot approaches the brake pedal.

Therefore, German utility model No. 89 11 963 U1 discloses the provision of a switch in the driver's radius of action which shall be actuated by the driver intentionally as soon as a situation occurs which leads to assume a source of danger. When the driver actuates the switch in such a situation, an automatic braking operation will the triggered alone due to a criterion which evaluates the speed at which the accelerator pedal is released.

Admittedly, this method is easy to realize. However, the precondition is that the driver's action is purposeful and that he recognizes imminent dangerous situations.

An object of the present invention is to configure the brake device so that the automatic braking operation is triggered only if the driver actually wishes to brake.

SUMMARY OF THE INVENTION

To this end, it is proposed that the switch by which a defined situation is sensed, the approach, the contact or actuation of the clutch pedal or the gear shift lever be recorded and that the automatic braking operation is not triggered when such a type of situation is identified.

This suggestion is based on the idea of excluding those cases in which the accelerator pedal is released from being taken into account for the initiation of an automatic braking operation. The reason is that these cases are obviously due to the fact that the driver wishes to shift gears. This intention, in turn, is sensed by way of the switch which, as mentioned hereinabove, reacts to the approach, contact or actuation of a corresponding actuating member.

In a most simple case, a contact switch can be mounted in the shift lever ball. It is certainly possible to mount several switches on the lever ball. In general, however, it will be sufficient to incorporate one switch on the front side of the switch lever because the driver's hand is typically placed on the lever ball in this area.

The present invention will be explained in the following by way of two Figures.

DETAILED DESCRIPTION OF THE DRAWINGS

Figure 1:
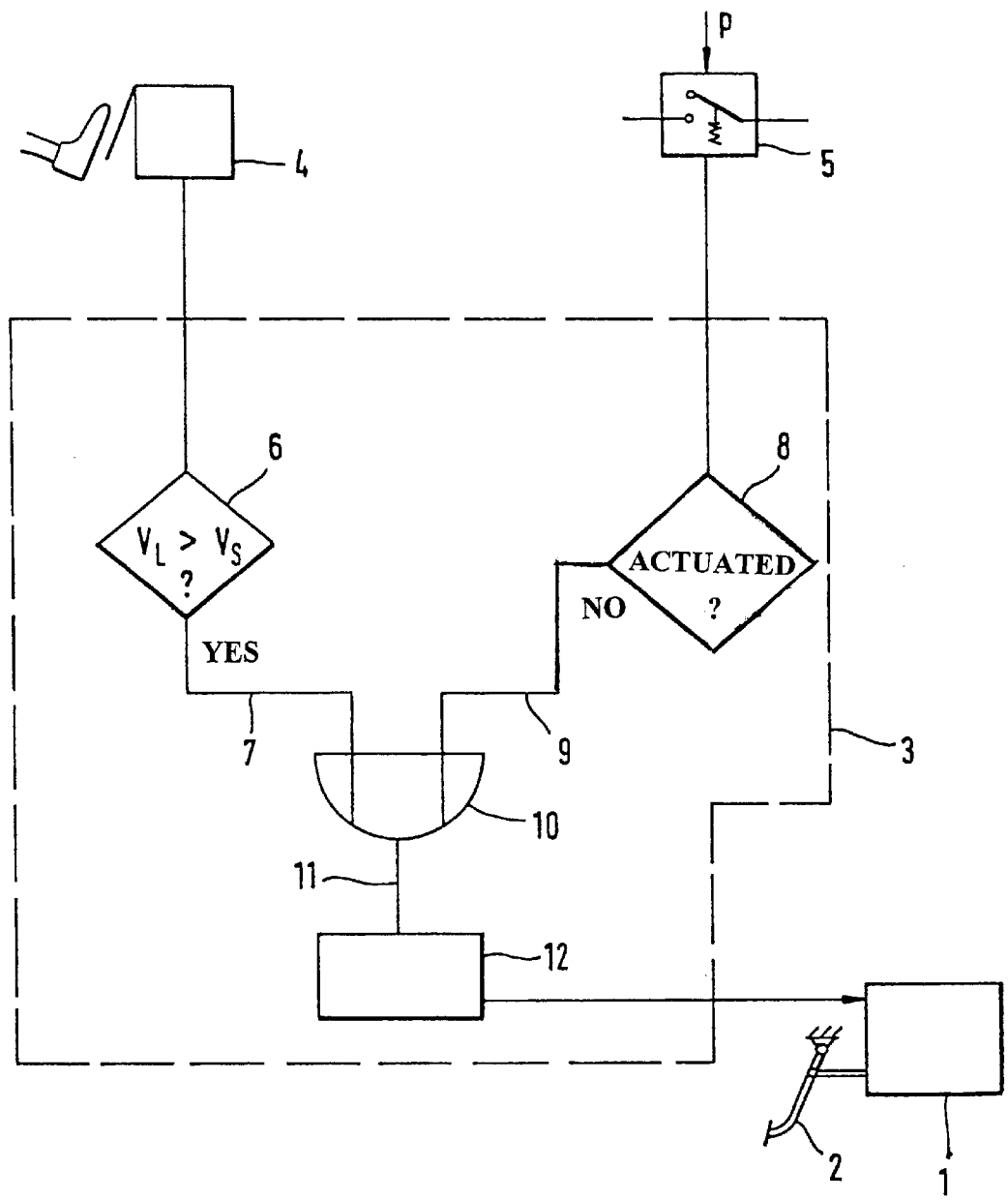
FIG. 1 is a basic circuit diagram of the invention.

Initially, the embodiment of FIG. 1 is referred to. Reference numeral 1 designates a brake actuation system which includes a brake assistant function. Braking pressure generators of this type comprise, for example, a master cylinder preceded by a booster. The booster can be actuated by way of a pedal 2 in such a way that the booster, in addition to the pedal force, applies an actuating force to the master cylinder which is proportional to the pedal force. The booster includes means permitting its actuation even in the absence of pedal application. These means typically include an electromagnetically operable valve which can be actuated by way of an evaluating circuit 3.

An accelerator pedal sensor 4, on the one hand, and a pressure switch 5 fitted to the shift lever ball, on the other hand, are provided to control the brake force booster 1. The accelerator pedal sensor 4 permits sensing the release speed of the accelerator pedal.

The pressure switch reacts to contact so that it can be detected whether a driver's hand is placed on the shift lever ball. Both sensor signals are sent to the evaluating circuit and undergo evaluating criteria. A check is made in a comparator 6 as to whether the release speed $V_L$ exceeds a limit speed $V_S$.

In the affirmative, a HIGH signal is sent to an AND-member 10 via a line 7.

The signal of switch 5 is also sent to a comparator 8 that checks whether the switch is actuated or not. In the absence of actuation, a HIGH signal is sent to the AND-member 10 via a line 9. If a HIGH signal prevails on line 7 and on line 9, a HIGH signal will be applied to output line 11 as well. The evaluating circuit will then cause a driver 12 to apply a voltage to the operating magnet of the brake assistant. The booster will be put in action without pedal application. Depending on what marginal conditions exist and have been sensed in addition, it is possible to achieve the maximum attainable boosting force of the booster so that a hard stop is initiated. It is also possible that the booster actuates the brake system only to such an extent that the lost travels within the brake system are overcome, thereby permitting a build-up of braking pressure instantaneously with the pedal application.

Figure 2:
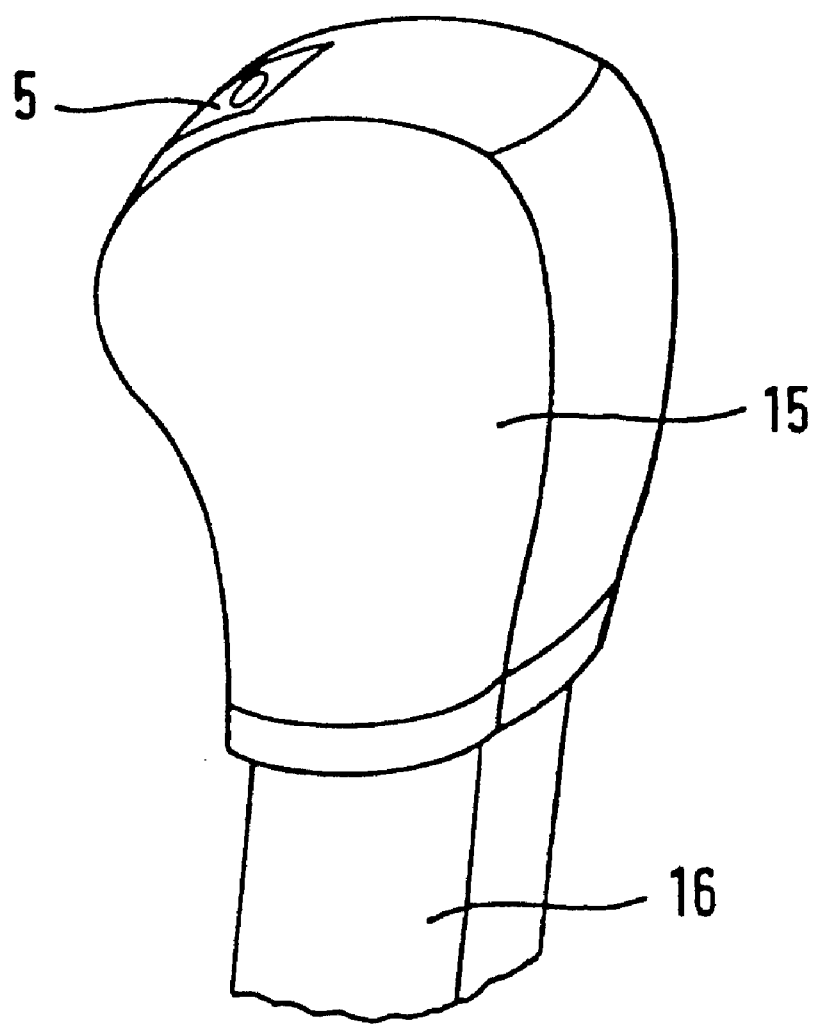
FIG. 2 is a view of a shift lever ball with a pressure switch.

FIG. 2 shows a ball 15 of a shift lever 16 having a pressure switch mounted on its front side.

What is claimed is:

1. A brake device in an automotive vehicle including an accelerator pedal and a mechanical transmission, wherein the brake device is actuated by a brake pedal, on the one hand, and, irrespective of the brake pedal, by an assistant triggered by a release signal, on the other hand, including a device for sensing the release speed of the accelerator pedal, an evaluating unit which has means permitting a comparison of the release speed with a limit value and generating a release signal for the assistant, a switch to be actuated by the driver, wherein the release signal is generated and issued only in a defined condition of the switch, the switch being capable of sensing an action indicative of an intent to switch gears, wherein said switch is located in a shift lever hand ball of the vehicle and wherein said switch is configured as a contact switch.

2. Brake device as claimed in claim 1, wherein the switch is mounted on that side of the shift lever which, points to the front of the vehicle.

* * * * *